United States Patent [19]

Luger

[11] 3,906,481

[45] Sept. 16, 1975

[54] TRANSISTOR NETWORK FOR INFORMATION STORAGE AND RETRIEVAL

[75] Inventor: Paul P. Luger, Spokane, Wash.

[73] Assignee: The Pioneer Educational Society, Portland, Oreg.

[22] Filed: Sept. 21, 1973

[21] Appl. No.: 399,474

Related U.S. Application Data

[63] Continuation-in-part of Ser. No. 238,042, March 27, 1972, Pat. No. 3,803,581.

[52] U.S. Cl. ............... 340/324 R; 35/9 B; 35/31 C; 340/166 R

[51] Int. Cl.$^2$ ........................................ G06K 15/18

[58] Field of Search ........ 340/166 K, 324 R, 378 R, 340/162, 166 R; 35/9 B, 22 R, 31 C

[56] References Cited

UNITED STATES PATENTS

| | | | |
|---|---|---|---|
| 2,349,066 | 5/1944 | Witter | 35/22 R |
| 2,512,837 | 6/1950 | Pescatori | 35/31 C |
| 2,970,386 | 2/1961 | Knutson | 35/31 C |
| 3,226,533 | 12/1965 | Beers | 35/31 C |
| 3,634,950 | 1/1972 | McKay | 35/9 B |
| 3,803,581 | 4/1974 | Luger | 340/324 R |

*Primary Examiner*—Marshall M. Curtis

[57] ABSTRACT

An electric network, representing fixed, determined information, and capable of specific information selection and read-out, is described. Applications are made for mathematical operations and to information storage and display. In general the system employs switches, lamps and solid state elements including diodes and transistors. Basically, switching provides multiple circuit paths. Each path represents fixed information or significance; electric current flow in a specific path energizes the indicating hardware associated with that specific information or significance when current in a specific path energizes indicating hardware. Decimal multiplication is shown in detail. A system of information indexing and read-out is shown.

11 Claims, 4 Drawing Figures

TRANSISTOR NETWORK FOR INFORMATION STORAGE AND RETRIEVAL

The present invention is a continuation-in-part of Ser. No. 238,042 filed Mar. 27, 1972, now U.S. Pat. No. 3,803,581.

BACKGROUND OF THE INVENTION

Instruments of this invention employ two or more basic switches by means of which input information may be selected. Thus, for example a multiplicand and multiplier may be selected. A suitable electric circuit consisting of transistors and, possibly, other solid state devices together with read-out devices are used to indicate output values, as, for example, the product of two numbers. Read-out hardware may employ various known devices such as electric lamps, decade read-out (as nixie tubes), light emitting diodes etc.

The work "input" implies a selection of information from a total array of fixed information which the circuit paths are designed to represent or index. The word input, therefore is not to be understood in the computer input sense. Likewise the word "output" is used here to represent any method of displaying or communicating the fixed information that the circuits are set to represent. This output information might be products, numerical or alphanumeric significance or information on a tape or record, and so forth.

The electric circuits to be described will employ transistor switching arrays. While selection of input is made by the basic switches just mentioned, transistor switching makes possible multiple path routes each of which is fitted to represent information or memorized significance. The solid state transistors and other circuit devices lend themselves to miniaturization.

Among the advantages of this new invention over the earlier version are packaging and attractive marketing features: first, the large, awkward, multiple-sectioned switches are no longer required, and secondly, since hundreds of transistors can be built into a monolithic chip the size of a dime, it turns out, that information storage by means of the circuits of this invention is greatly compacted and facilitated.

First will be described a system for decimal multiplication and a read-out in electric lamps where one lamp is employed for each digit of the decimal system in the usual fashion. It should be understood that numbers in any base system might be employed and instruments may be designed to change from one base system to another.

The application of the invention to division will be evident from the examples below.

For decimal multiplication products will be described for integer values from 0 × 0 up to 9 × 9. It will then be evident how to extend applications to 12 × 12 or to higher values.

Where isolation of circuit paths that use the same output devices is required, diodes are employed and a minimal use of diodes is described.

It will also be shown how to apply this new concept to a system of indexing and examples will be given.

THE DRAWINGS

The following drawings are useful to further describe the use of these new circuits:

DETAILED DESCRIPTION OF THE INVENTION

Table I shows an array of products. The products are formed and indexed by the numbers found in the column on the right of the array and the row beneath. All of these products may be arranged to a system employing two basic switches.

TABLE I

| | | | | | | | | | | |
|---|---|---|---|---|---|---|---|---|---|---|
| 0 | 9 | 18 | 27 | 36 | 45 | 54 | 63 | 72 | 81 | 9 |
| 0 | 8 | 16 | 24 | 32 | 40 | 48 | 56 | 64 | 72 | 8 |
| 0 | 7 | 14 | 21 | 28 | 35 | 42 | 49 | 56 | 63 | 7 |
| 0 | 6 | 12 | 18 | 24 | 30 | 36 | 42 | 48 | 54 | 6 |
| 0 | 5 | 10 | 15 | 20 | 25 | 30 | 35 | 40 | 45 | 5 |
| 0 | 4 | 8 | 12 | 16 | 20 | 24 | 28 | 32 | 36 | 4 |
| 0 | 3 | 6 | 9 | 12 | 15 | 18 | 21 | 24 | 27 | 3 |
| 0 | 2 | 4 | 6 | 8 | 10 | 12 | 14 | 16 | 18 | 2 |
| 0 | 1 | 2 | 3 | 4 | 5 | 6 | 7 | 8 | 9 | 1 |
| 0 | 1 | 2 | 3 | 4 | 5 | 6 | 7 | 8 | 9 | |

Figure 1:
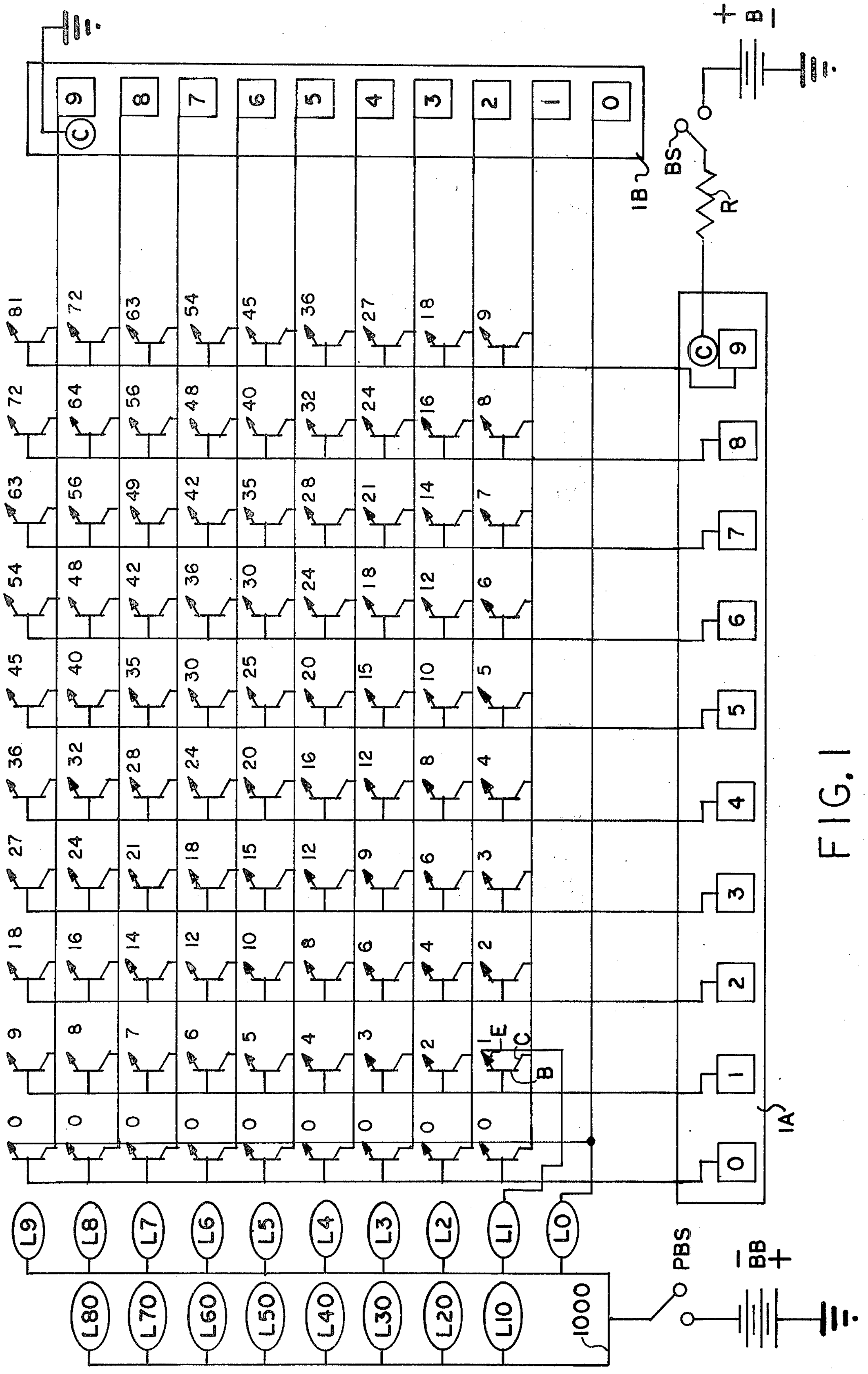
FIG. 1 shows a two-switch arrangement that employs transistor switching.

Turning first to FIG. 1, basic switches 1-A and 1-B are shown. Both switches may be selected to be of the rotary type and both have a single pole, ten position arrangement. Knobs are not shown in the diagram. The ten stationary contacts of switch 1-A and 1-B are shown as rectangles in the diagram. The common slide contacts are shown at C and are encircled. With rotation of either switch its movable contact is brought into electrical connection with each of the 10 rectangular contacts shown.

Since neither knobs or dials are shown in FIG. 1 for switches 1A and 1B, the ten rectangular contacts of these switches have been labeled with values that are to be engraved on switch dials at the corresponding switch positions. It can be seen at a glance that these values correspond to values found in the bottom row and right column of Table I (except for the zero, not shown in the right column). It is seen, then, that the labels of the rectangular contacts of 1A and 1B of FIG. 1 represent the multiplicands and multipliers of all the products shown in Table I.

Referring to Table I and FIG. 1, the array of 90 products of Table I may be seen to correspond numerically to the array of 90 transistors shown in FIG. 1. Opposite the emitter of each transistor is inscribed this product integer which the transistor may be considered to represent.

Connections to transistors are described by reference to the transistor that represents product 1. Thus E, shown for transistor 1, represents its emitter contact, C its collector contact and B is the base of the transistor. The other transistors will also be referred to by reference to the product values they represent. The 90 transistors are identical in type as the diagram Also shown in FIG. 1 are 18 electric lamps designated from L0 through L9 and from L 10 through L 80 with common terminal at 1000. These are shown in circuit with a battery or power source at BB, and a push button switch at PBS.

Switch 1-A is connected through its movable contact C to a current limiting resistor at R, through battery switch BS, to battery B, the negative side of which is grounded. For a particular position of switch 1-A, Battery B can be in circuit with any column of 9 out of the 90 transistors shown. For the circuit shown connection is made to the base of each transistor.

Switch 1-B through its movable contact at C serves to ground a row of the 90 transistors one row at a time depending upon the position of the switch. Switch 1-B, as shown for this diagram, has one stationary contact connected to a row of 10 transistors. This connection is made to the transistor's collector terminal C, in this particular circuit example.

Referring again to the transistors of FIG. 1, each transistor is capable of switching on an indicating lamp (or lamps) to which it is connected. For example the transistor representing the product 1 is shown connected to lamp L 1. To turn on this transistor switch 1-A and switch 1-B are both set to positions 1. This permits current from battery BB to flow through lamp L 1 whenever the biasing potential of battery B is applied to the base of transistor 1.

It is clear, then, that by engraving the dials of 1-A and 1-B with values corresponding to the bottom row and right column of Table I, indication is made of the multiplicand and multiplier for the products shown in FIG. 1.

For purposes of describing the transistor arrays we consider them as arranged in rows and columns. Then, in FIG. 1, the bases of all transistors in each column are interconnected. Also the collectors of all transistors in each row are interconnected.

Since however various circuit designs are possible with transistors we will consider the transistor output terminal to be that terminal which is connected to an output indicating device. In FIG. 1, emitter terminals are connected to output lamps and thus are output terminals. Inspection of FIG. 1 shows that there are 9 zero product transistors, 1 unit product transistor, 2 transistors for each of the 2, 3, 5 and 7 products, 3 transistors for the 4 and 9 products and 4 transistors for the 6 and 8 products. The transistors that have equal products are all interconnected, i.e., the outputs of these transistors are interconnected. Let us call these interconnected outputs contact unions. A given contact union will represent a fixed product. Each of these contact unions are then connected to its own product-representing-lamp.

In FIG. 1 connection is shown only for the zero and the unity contact unions joined to their respective product-representing-lamps.

Note also how the stationary contact, 0, of switch 1-B is directly connected to lamp L0.

It should be clear then, that the circuit of FIG. 1 will select all the products represented by the transistor outputs of FIG. 1 (corresponding to Table I) and will "output" these products by means of indicating lamps, if the contact unions are properly connected to appropriate output indicating devices.

In general, we define a contact union as a single transistor output that represents information (here the information is a product); or, a contact union is two or more interconnected transistor outputs that represent the same information.

From FIG. 1, if we make a list of all the two-digit products, we will find that 4 contact unions are formed from only one transistor, 18 contact unions are formed from 2 transistors each, 2 contact unions are formed from 3 transistors each, 43 contact unions are formed from 4 transistors each.

In FIG. 1, lamp L0 is connected to the zero contact union and lamp L1 to contact union 1, as shown. These are the only contact unions shown connected in FIG. 1, but all the other single digit contact unions could be directly connected to their appropriate indicating lamps without the use of diodes. Thes are not shown connected so as not to clutter the drawing.

Figure 2:
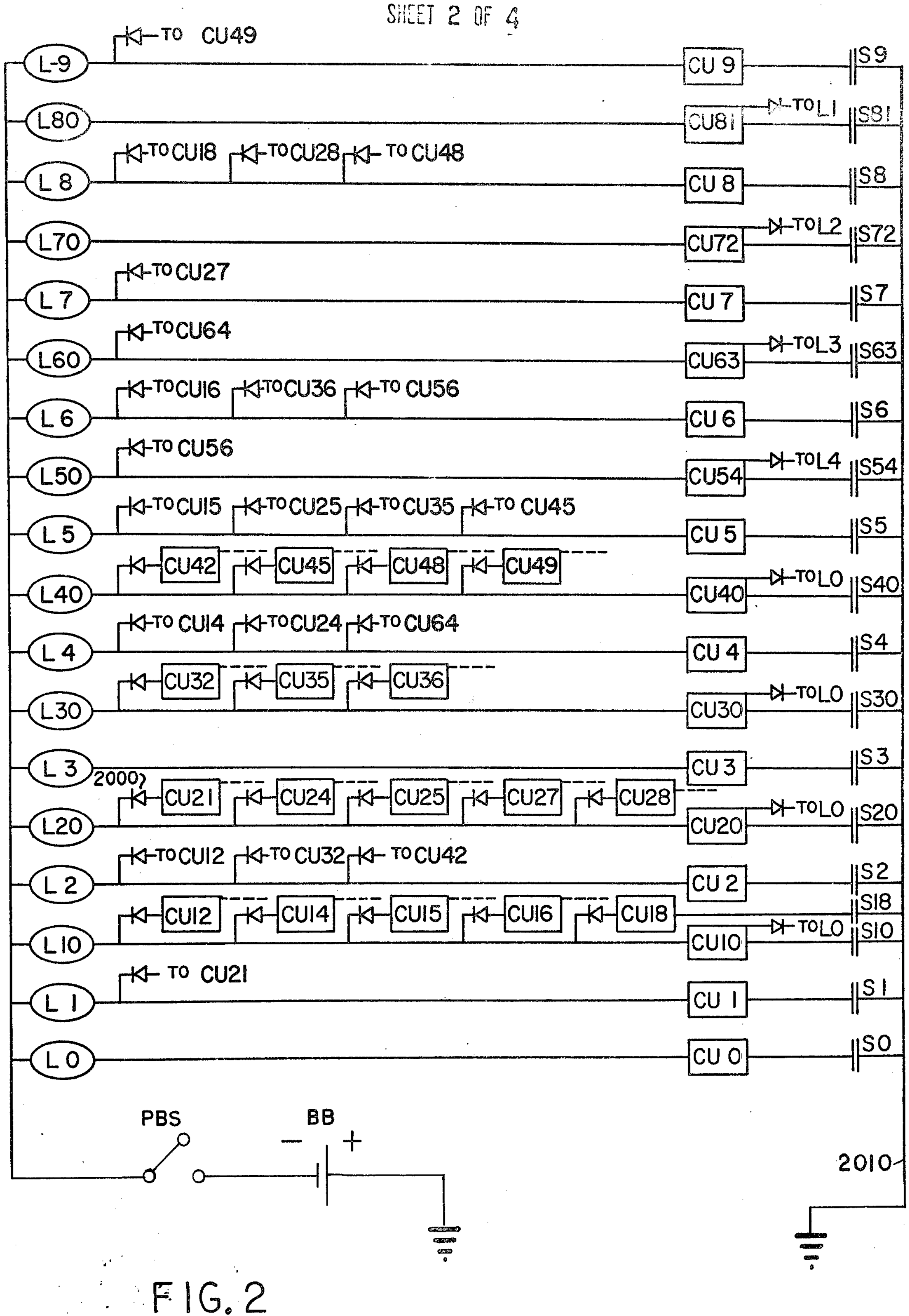
FIG. 2 shows an electric circuit useful for the understanding of integer multiplication.

We now turn to FIG. 2 which compliments FIG. 1 and shows the use of diodes in connecting the contact unions to their appropriate indicating lamps.

In FIG. 2 contact unions are represented by the abbreviation CU. Thus contact union 12 is designated CU12 and is enclosed in a rectangular box. In this manner all the contact unions of FIG. 1 are represented in FIG. 2. Note that CU25 even though connected to only one transistor of FIG. 1 is called a contact union and is represented by CU25 in a rectangular box.

Electric filament devices are indicated to L0 through L9 and also by L10 through L80 in FIG. 2 as in FIG. 1.

In regard to the use of diodes in FIG. 2, just as single digit products need not be connected to indicator devices or lamps by means of diodes so also, to each lamp or light L10 thorugh L90 in FIG. 2, one contact union may be directly connected without use of a diode. Thus FIG. 2 shows contact unions 0 through 9 connected directly to indicator lamps L0 through L9 respectively without an intervening diode; thus one contact union is diode free. And, likewise, contact unions 10, 20, 30, 40, 54, 63 and 72 and 81 of FIG. 2 are diode free and are connected respectively to lamps L10 through L80. All other contact unions require two diodes between themselves and the lamps they connect.

Thus, the diode at 2000 is connected to contact union CU21 (in a rectangular box), and so also, the diode at "TO CU21," is also connected to this same contact union CU21.

Note that many connections in the diagram of FIG. 2 are only indicated, as is this diode terminal at "TO CU21," in order to make the circuit diagram more readable. In this manner, then, all contact unions and their diodes are shown in FIG. 2. As in FIG. 1 so also in FIG. 2, a push button switch, PBS, a battery BB, one end of whic is grounded, is shown.

Symbolic switch contacts are shown on the right in FIG. 2. These are symbolic since, in reality, they represent the switching resultant upon the selection of a transistor by switches 1 A and 1 B (FIG. 1) as well as by the switching of the selected transistor itself. The transistor biasing battery B and battery switch BS of FIG. 1 are not shown in FIG. 2. These are understood as part of the symbolic switching represented by the symbolic switches SO through S81 of FIG. 2. However, not all such symbolic switches are shown since it is understood that each contact union shown in FIG. 2 (with rectangular box) should be connected into the circuit with its own symbolic contacts representative of the transistor switching resultant upon selection by positioning of switch 1 A and 1 B of FIG. 1. By way of example, contact union, CU18 is thus shown connected by means of S18 in FIG. 2. Note also the dotted line to the right of CU21 (in rectangular box). It indicates contact union 21 is to be connected through a symbolic switch (not shown) to the common connector at 2010. In this manner, all such dotted lines are to be interconnected. Connector 2010 is shown grounded, representative of the grounding of the common contact C of switch 1 B of FIG. 1.

It should be clear from the circuit of FIG. 2 that the diodes prevent current flow to the wrong indicator lamps. Suppose that in outputting product 12 current flowing from CU12 to L2 and L10 was not diode isolated. Then, current would also flow to contact unions CU4, CU5, CU6 and CU8, thus turning on lamps L4, L5, L6 and L8.

Modern decade read-out devices are of the conventionally described "seven segment" or "decimal" variety and with these might also be included individual filament devices that are arranged in rows, and columns of 10, for indicating decimal numbers. An example of the decimal read-out, e.g., is the nixie tube with 10 cathodes and one anode.

For this paper we define in a fashion analogous to the modern decade read-out, the number-base read-out device. A number-base read-out device is a read-out device for any number system, that is, for a number system with any base or radix. Thus, a binary read-out device or an octal read-out device or a decimal read-out device are examples of number-base read-out devices. However, since every integer greater than one can be the base or radix of a number system, a number-base read-out device is conceived as a general term referring to a read-out device for a number system with any radix.

Number-base read-out devices include also single filament devices arranged in rows with the number of single filament devices in each column equal to the base of the number system employed. We also refer to number-base read-out devices as read-out indicating devices or simply as indicating devices.

Number-base read-out devices, it is understood, incorporate connections for the display of each said digit which it is desired to represent in a given base system.

Figure 4:
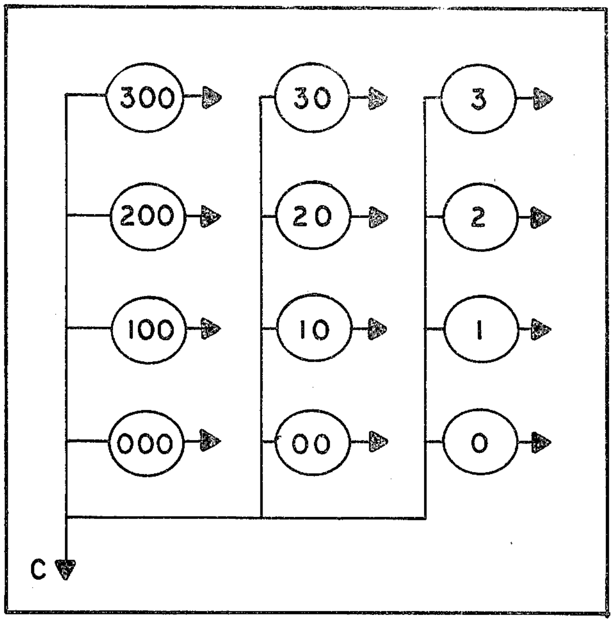
FIG. 4 shows a read-out device for a quartic system, an example of a number-base read-out device.

FIG. 4 is presented as an example of a number-base read-out device. Here the base or radix is 4. Connections terminating at C are common. The electric lamps, or liquid crystal devices or LED's to be energized are shown with numbers inscribed that indicate integers in the quartic system. The second connection to each indicating device, shown by the arrow, is to be connected to an appropriate transistor "output terminal" such as are shown in FIG. 1 at E.

As there are various possible ways of using diodes to interconnect contact unions with the various output indicating devices we will outline the general methods for making these connections as applied to FIG. 1 and FIG. 2.

I. The method most unsaving of diodes is to connect one diode between the output of each transistor and the indicating device or devices corresponding to each digit of the product represented by the transistor.

II. The next method for connecting diodes: having made the interconnection of transistor outputs that represent equal products, one diode is connected between each product-representing-contact-union and each indicating device that corresponds to each digit of the product.

III. This method is the same as II, except that one direct connection is made between each of all indicating devices and one product-representing-contact-union without the use of an intervening diode. This method is used to FIG. 2.

IV. This method is the same as III, except that if there is more than a single product-representing-contact-union requiring connection to the same pair of indicating devices, one diode only is employed for connection to any such contact union after the first; and this diode is interconnected between the first connected contact union (already connected to the pair of indicating lamps) and the second contact union that represents the same pair of digits.

V. This method is the same as IV, except that if there is more than a single contact union requiring connection to the same triple of indicating devices one diode only is employed for this interconnection as described in IV for the pair of indicating devices and so on for higher duplicates of indicating devices.

From these concepts of diode minimization one can calculate the minimum number of diodes D, required for any situation. Referring to the system of Table I and FIG. 2, the minimum diodes, D, is equal to two times the number of contact unions representing two digits minus the number of indicators used to represent the second digit. Thus, $$D = [2 \times (\text{cu of 2 digits})] - [\text{No. of 2nd digit indicators}] = [2 \times (27)] - [8] = 46 \quad (1)$$

For the system of Multiplication to 12 × 12, formula (1) requires another term to take account of the number of three digit products. Note the 3rd term on the right in the following equation:

$$D = [2 \times (\text{cu of 2 digits})] - [\text{No. of second digit indicators}] + \{[3 \times (\text{cu of 3 digits})] - [\text{No. of third digit indicators}] - [\text{No. of diodes connected between contact unions}]\} = [2 \times (43)] - [10] + \{[3 \times (7)] - [1] - [5]\} = 91. \quad (2)$$

It should be clear how the system may be extended to products of any number of digits. As one goes to systems containing products of four or more digits, more terms are added to Eq (2).

It may be noted that the output terminal of a transistor which is to be connected to an indicating device may be referred to as a product-representing-terminal or a product-representing-contact-union. Since the transistors might be thought of as representing output information, they, or the interconnected terminals of transistors representing the same output information (contact unions), may be referred to as output representing-contact-terminals or simply output terminals.

Figure 3:
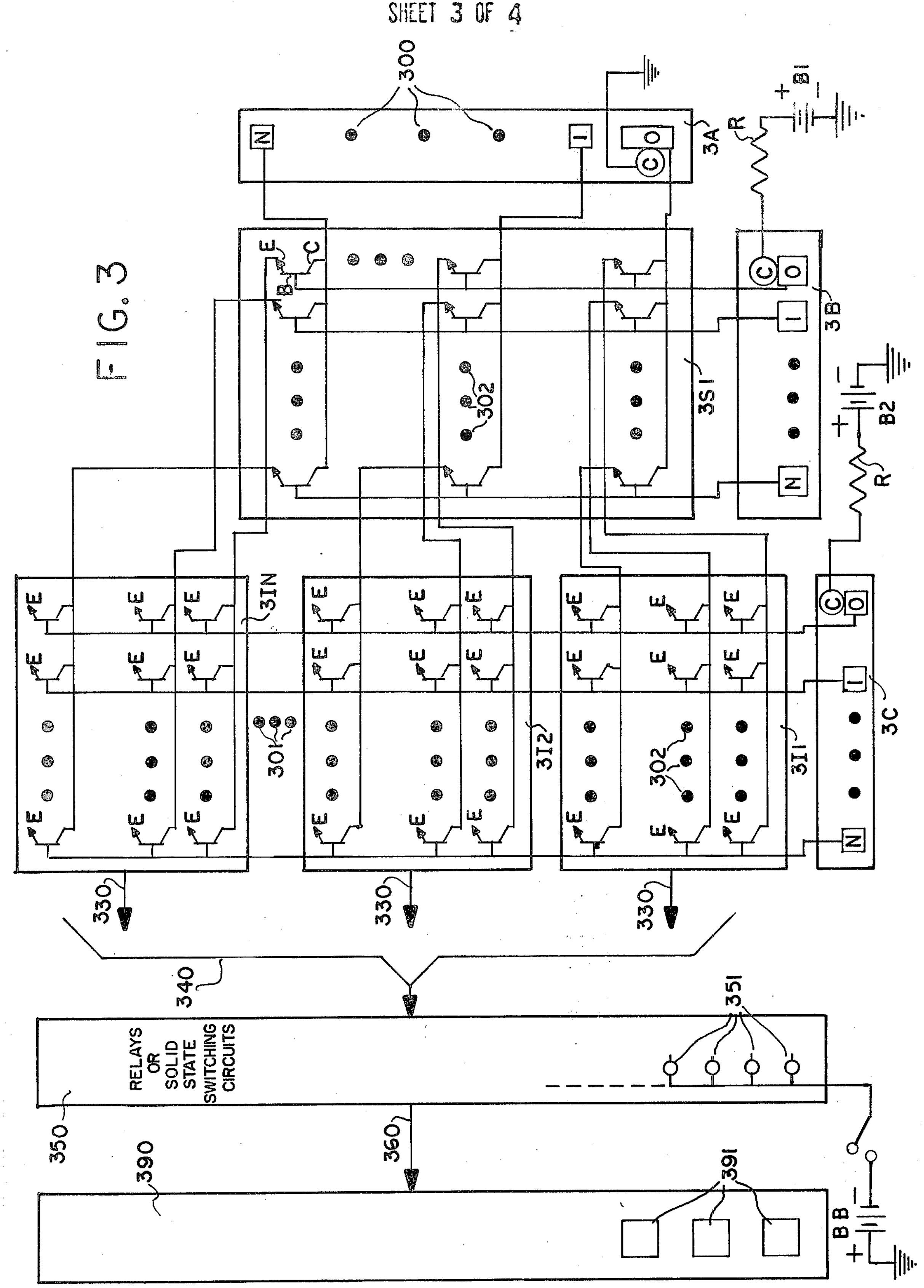
FIG. 3 shows a transistorized circuit useful for indexing.

FIG. 3 shows a transistorized general memory system for information storage or for a system of indexing. Basic switches 3A, 3B and 3C are single pole multiple position switches with an indefinite number, N, of stationary contacts indicated by the numbered rectangles. The last rectangle is therefore lettered N and is separated by three dots (see 300 of FIG. 1) to point out the indefinite number of stationary contacts which the switches may have. The single movable contact of 3A, 3B and 3C is shown encircled at C.

The transistor array at 3S1, by means of switch 3A, selects an array of transistors as indicated from 3I1, 3I2 and up to 3IN. The triple dots at 301 indicate the possibility of a design of any number of such indexing transistor arrays up to the last indexing array 3IN. So also the triple dots as numbered at 302 which indicate an indefinite number of transistors in the rows of the arrays in FIG. 3.

It can be seen that Switch 3B selects a column of transistors in array 3S1 and in conjunction with Switch 3A a selection of only one transistor is made for operation from array 3S1. This single transistor, thereupon makes selection of one only row in all the arrays of 3I1 to 3IN.

Finally Switch 3C will select one single transistor from this selected row so that only one transistor in the arrays 3I1 to 3IN will be selected for operation.

In transistor array 3S1, the base B, the collector C and the emitter E is labelled for one transistor as explicative of the transistors of FIG. 3.

It should be noticed for all the arrays of FIG. 3, namely arrays 3S1, 3I1, 3I2 and up to 3IN, an interconnection is made of the transistors in each column of each array. This interconnection will be referred to as an array-column-connection. Likewise, one of the other two transistor connections are also interconnected for each row of each array. This interconnection will be referred to as as array-row-connection. The same terminology may be applied to the transistor array of FIG. 1. The connections from the "outputs" of the transistors of FIG. 3 at 3I1 to 3IN, labelled at E, must be connected to output indicating devices or output controlling devices, symbolized by the rectangle at 350. Furthermore, arrows at 330 and the bracket at 340 indicate that transistor connections at E must be completed through the circuit at 350. At 351, for example, lamp indicating devices or relay coils are shown. As in FIG. 1 and FIG. 2, a particular application of the circuit and the particular hardware employed within 350 will determine these interconnections.

Finally, the rectangle at 390 is symbolic of additional equipment that might be required for a particular application of the circuit of FIG. 3. For example, magnetic tape players and, or, picture projection equipment, even other devices are indicated at 391 in rectangle 390. The auxiliary equipment of 390, in turn is selected and controlled by relays or transistor switching in 350. This electrical control is indicated by the arrow at 360.

As an example, if the transistors shown in FIG. 3 at 3S1 and at 3I1 to 3IN are not to carry power but are to be merely controlling, then power carrying transistors may be supplied at 351 of FIG. 3 which in turn will operate the power devices shown at 391.

Furthermore, the same concept may be applied to FIG. 1. If the transistors of FIG. 1 are designed for control only, then power transistors may be supplied, one for each of the electric lamps L0 to L9 and L10 to L80 of FIG. 1.

In FIG. 3, power source, BB, is required to operate output indicator lamps at 350. Likewise, batteries at B1 and B2 are shown as a source of base potential for the switching transistors of FIG. 3. When instruments are employed at 390 for "output" of information from magnetic tape or record or picture projector it will be understood that they are operated from ordinary line power but are controlled in the ordinary way by means of relays or power transistor switching at 350. The "input" to the instrument of FIG. 3 may be looked upon as the information engraved on the dials that indicate switch positions. In FIG. 1, this information was the integer value of multiplicand and multiplier.

The "output" of the instrument of FIG. 3 is indicated at 350 for the case of filament indicating devices, nixie tubes and illuminated alphanumeric displays but at 390 in the case of magnetic tape players, record players, projectors and system-type display devices in general. In the latter case relays or solid state switching at 350 controls the final multiple output indicator means, of whatever type, indicated at 390.

The term "multiple output indicator means" as used in this paper includes the widest range of output devices and hardware. Hence, it includes number-base read-out devices as well as all types of alphanumeric indicating hardware. Again, it includes magnetic tape players, record players, projectors and such audio or visual types of machines that are capable of significance retention and display.

These multiple output indicator means, employing electric contact connections, are also meant to include relays and switching devices in as much as these may be employed for controlling the various types of multiple output indicating hardware such as magnetic players, record players, projectors, alphanumeric displays etc.

Following are three types of applications for the instrument of FIG. 3, together with examples:

1. Indexing a parameter dependent upon variables.
2. Change of numbers from one base system to another.
3. Selecting programs as for a broadcasting station and for school instructional use.

For an example of the indexing of a parameter choose the norm of a vector $u$ in Euclidean three space, $R^3$. Allow the $x$, $y$ and $z$ components of $u$ to range between zero and unity and engrave values on the switches 3A, 3B and 3C from 0 to 9 in one tenth increments. Then compute values of the norm by the following formula:

$$\|u\| = (u_1^2 + u_2^2 + u_3^2)^{1/2}$$

Then the norms (lengths) of vectors from the combinations of these components in 0.1 increments between zero and unity are connected with appropriate electric filament indicating devices (including necessary diodes) at 350. In other words, after connecting the outputs at E into contact unions, these are joined to the output indicating devices at 350 utilizing the diode savings theory already described.

As an example of indexing which is more mediate and less direct, index a tensor whose listed values are numbered in a table, let us suppose. Take the three-dimensional cartesian, rotation tensor and assume for the alpha, beta and gamma angles 30° incrments. Arrange the indexing for the three basic switches of FIG. 3. Let switch 3A represent the gamma angles from 0 through 180 in steps of 30°, switch 3B the beta angles and switch 3C the alpha angles. Table II exemplifies two of seven arrays that show the output indexing. Thus the index numbers in the arrays of Table II are wired to the output terminals of 3I1 and 3I2, as was done in FIG. 1 and FIG. 2 for the product values of Table I.

In Table III are shown a few samples of the indexed tensor corresponding to Table II. These 3×3 matrices, incremented for 30°, number 343 (in one only hemisphere). Note that some of these tensors are numerically equal (compare 2 and 50 of Table III).

TABLE II

Index of the Three-space, Cartesian, Rotation Tensor

| | | | | | | | |
|---|---|---|---|---|---|---|---|
| ALPHA: | | | | | | | |
| 0 | 1 | 8 | 15 | 22 | 29 | 36 | 43 |
| 30 | 2 | 9 | 16 | 23 | 30 | 37 | 44 |
| 60 | 3 | 10 | 17 | 24 | 31 | 38 | 45 |

TABLE II-Continued

| Index of the Three-space, Cartesian, Rotation Tensor | | | | | | | |
|---|---|---|---|---|---|---|---|
| 90 | 4 | 11 | 18 | 25 | 32 | 39 | 46 |
| 120 | 5 | 12 | 19 | 26 | 33 | 40 | 47 |
| 150 | 6 | 13 | 20 | 27 | 34 | 41 | 48 |
| 180 | 7 | 14 | 21 | 28 | 35 | 42 | 49 |
| BETA: | 0 | 30 | 60 | 90 | 120 | 150 | 180 |
| GAMMA=0 | | | | | | | |
| ALPHA: | | | | | | | |
| 0 | 50 | 57 | 64 | 71 | 78 | 85 | 92 |
| 30 | 51 | 58 | 65 | 72 | 79 | 86 | 93 |
| 60 | 52 | 59 | 66 | 73 | 80 | 87 | 94 |
| 90 | 53 | 60 | 67 | 74 | 81 | 88 | 95 |
| 120 | 54 | 61 | 68 | 75 | 82 | 89 | 96 |
| 150 | 55 | 62 | 69 | 76 | 83 | 90 | 97 |
| 180 | 56 | 63 | 70 | 77 | 84 | 91 | 98 |
| BETA: | 0 | 30 | 60 | 90 | 120 | 150 | 180 |
| GAMMA=30 | | | | | | | |

TABLE III

| Tensor Number | Examples of The Three-space, Cartesian, Rotation Tensor: | | |
|---|---|---|---|
| 1 | 1 | 0 | 0 |
| | 0 | 1 | 0 |
| | 0 | 0 | 1 |
| 2 | .8660 | −.5 | 0 |
| | .5 | .8660 | 0 |
| | 0 | 0 | 1 |
| 50 | .866 | −.5 | 0 |
| | .5 | .8660 | 0 |
| | 0 | 0 | 1 |
| 78 | −.4330 | .25 | .8660 |
| | .5 | .8660 | 0 |
| | −.75 | .433 | −.5 |
| 90 | .3995 | −.8080 | −.4330 |
| | −.8080 | −.53349 | .25 |
| | −.4330 | .25 | −.8660 |

An alternative approach is to immediately output the matrices employing six sets of output indicator read-out devices, arranged to appear as a matrix as in Table III, instead of the index numbers shown in Table II.

As an example of changing numbers from one base system to another: choose decimal numbers from 0 to 1000 and change them to octal. For "input" mark the dial of Switch 3A with numbers from 0 to 9 in steps of 1, switch 3B with numbers from 0 to 100 in steps of 10 and switch 3C with numbers from 0 to 1000 in steps of 100. The octal equivalents of the decimal "input" values are then connected to output indicator lamps which may be arranged in eight rows and four columns capable of representing the highest octal number, 1750 (1000 in decimal). It should be noted here that the digital number which is converted to octal in the sum of the three dial readings. Indicator lamps are interconnected to the transistor "outputs" at E by means of appropriate isolation diodes as previously described for FIG. 1 and FIG. 2.

Another application for the switching instrument of FIG. 3 is described for the indexing and selection of tape or record players, and scheduling them for quick play from among many such players, arranged in banks. One can understand the inconvenience of going to a particular machine in the bank to switch it on and off when instant play is required, as in a broadcasting station.

The switches of FIG. 3 are made to index the various machines. For a given days broadcast, selections are placed by means of records and/or cassettes in each machine and a schedule of broadcasting is compiled. The schedule is a list containing Time of Day, Selection to be played, and Switch positions corresponding to each selection.

In FIG. 3, let a bank of tape and/or record players be indicated at 390; and let a bank of relays be employed at 350 and individually indicated at 351. The transistor outputs at E are connected to the various relays so that by various combinations of switches 3A, 3B and 3C any output device may be controlled by means of the relays. It is clear that relays at 351 will be designed to operate sufficient contact closures so that the tape and record players may be interconnected for control.

Table IV exemplifies another application in which the three basic switches of FIG. 3 are conveniently employed.

Suppose a high school has a system for self study, employing magnetic tape players fitted with endless-tape cassettes. The cassettes contain, let us suppose, one lesson per cassette and, suppose, there are up to ten lessons per subject. Each cassette might correspond to a different topic of instruction in each subject for each grade.

If, 390 of FIG. 3 represents a bank of magnetic tape players, 350 might be supplied with electric relays, one for each contact terminal employed in the various sections of transistor arrays 3I1 to 3I10.

For self study each student goes to a magnetic tape player station supplied with controls consisting of switches 3A, 3B and 3C (together with the instrument of FIG. 3 except for the tape players at 390 which are supplied once for the entire system). Each station is wired for sound. Such an arrangement makes it possible for many students to listen to the same lesson while other students listen to other lessons which they select.

The relay that is closed when a given transistor is selected at a student station, carries auxiliary contacts. One of these contacts turns on the selected magnetic tape player, and another contact connects in the sound at the student hearing station, i.e. connects the students earphone or speaker to the appropriate magnetic tape device.

TABLE IV

| SWITCH: | A GRADES | B SUBJECTS | C LESSON |
|---|---|---|---|
| | 9 | 1 | 1 |
| | 10 | 2 | 2 |
| | 11 | 3 | — |
| | 12 | 4 | — |
| | | 5 | 10 |

It should be clear that such a system might be designed for a magnetic tape that is synchronized with a slide projector. In such an arrangement the slide projector and the cassette of slides which corresponds to the lesson to be heard and viewed is at the student station. Further contacts on the relays (at 350 of FIG. 3) are supplied to keep the slide projector cassette and the central magnetic tape in synchronization. Methods of synchronizing projector and magnetic player for sound are well known to the art.

It is seen from these examples that one may look upon transistors or the transistor output terminals (whether emitters, collectors or even the base terminal of the transistor) as "storage" devices and "containing" information stored-for-output, since these circuits are so designed that flow of current through these terminals always displays particular, fixed information.

This development, then, makes it possible both to "store" and "index" information and may be considered a device for significance memorization and recall.

Having presented my invention, what I claim is:

1. In an electric product indicating network for obtaining products of multiplicands and multipliers, said network comprising:

a. a first basic switch member having one movable contact and several stationary contacts, b. a second basic switch member having one movable contact and several stationary contacts;

c. an array of transistors arrangeable in rows and columns, each said transistor having a first, a second and a third transistor connection;

d. said first connection of each said transistor in each said column in said array being interconnected, and each said interconnected first connection of each said column being connected to one said stationary contact of first said basic switch member;

e. said second transistor connection in each said row in said array being interconnected, and each said interconnected second transistor connection of each said row being connected to one said stationary contact of said second basic switch member;

f. said third transistor connection of each said transistor of said transistor array being a product-representing-terminal for the two positions of said first and said second basic switch member;

g. product indicating devices for representing numerical digits each having electric connections;

h. a first and a second source of electric power potential;

i. said product-representing-terminals that represent the same product being interconnected to form contact unions, said product-representing terminals that represent unique products also being called contact unions;

j. current isolation devices, one said current isolation device being connected between each said product indicating device and each said contact union;

k. permitting, however, one such connection to each of all said product indicating devices to be directly connected without an intervening said current isolation device;

l. one said electric connection of each said product indicating device being interconnected and also connected to a terminal of said first source of electric potential; a second terminal of said first source of electrical potential being connected to said movable contact of said second basic switch member; and, m. said second source of electric potential being connected between said moving contact of said first basic switch member and said moving contact of said second basic switch member.

2. In an electrical network according to claim 1 and comprising:

a. said electric current isolation devices being diodes;

b. said product indicating devices being number-base read-out devices; and, c. said contact unions representing the products of the numbers indicating the positions of said first and said second basic switch members.

3. In an electric product indicating network according to claim 1 and comprising:

a. said product indicating devices being number-base read-out devices;

b. said electric current isolation devices being diodes;

c. one of said diodes being connected for each said digit of the product represented by each said contact union between that contact union and the said connection to said number-base read-out device representative of said digit;

1. permitting, however, as already said, one such connection between said contact unions and said connection to said number-base read-out devices to be directly connected without an intervening diode device.
2. said permitting also in case of more than a first connected contact union to a pair of said connections to said number-base read-out devices, one said diode only to interconnect between first said contact union and any later connected contact union representing the same two identical digits;
3. and permitting also, in the case of more than one contact union representing the same three digits the use of one only diode in the same fashion as (2) above and so on in the case of contact unions that represent the same four digits or higher numbers of similar digits.

4. In combination, in an information storage and read-out electric network, said network comprising:

a. a first, a second and a third basic switch, each said basic switch having one movable contact and two or more stationary contacts;

b. transistor arrays, and transistors in each said transistor array arrangeable as if in rows and columns, and each transistor of said arrays having a first, a second and a third transistor connection;

c. in each said transistor array, each column of transistors interconnected at said first connection of each said transistor to form an array-column-connection, there being one said array-column-connection for each column in each said array; and each said row in each said transistor array being interconnected at said second transistor connection of each said transistor to form an array-row-connection for each said row;

d. in a first transistor array each said array-row-connection being connected to a said stationary contact of said first basic switch member, and each said array-column-connection being connected to a said stationary contact of said second basic switch member;

e. in a second and third and higher numbered transistor array, one array-column-connection from each of said second and third and higher numbered arrays being interconnected and connected to a stationary contact of said third basic switch member;

f. likewise a second array-column-interconnection from each of said second and third and higher numbered arrays being interconnected and connected to a second stationary contact of said third basic switch member and so on until all array-column-connections are interconnected to an array-column-connection in each second and third and higher numbered array and said interconnected array-column-connections being connected to a stationary contact of said third basic switch member;

g. said third transistor connection of each said transistor of said first transistor array being connected to one said array-row-connection among all said array-row-connections of said second and third and higher numbered transistor arrays;

h. multiple output indicator means electrically operable, each having electric contact connections;

i. said third transistor connection of said second and third and higher transistor arrays that represent the same identical output information or significance being interconnected to form contact unions;

j. said third transistor connections of said second and third and higher transistor arrays that represent unique output information or significance also being called contact unions;

k. current isolation devices;

l. one said current isolation device being connected between each said output indicator means and said contact union;

m. permitting, however, one such connection to each of all said output indicator means to be directly connected without an intervening said current isolation device;

n. a first power source connected to one of said electric contact connections of each said output indicator means, and said first power source connected to said moving contact of said first basic switch means; and, o. a second power source connected to the moving contacts of said second and third basic switch members and also connected to the moving contact of said first basic switch member.

5. In an information storage and read-out network, as described in claim 4 and comprising:

a. said multiple output indicator means being relay devices; and, b. said relay devices being connected to control other output indicator means.

6. In an information storage and read-out network as described in claim 4 and comprising:

a. said multiple output indicator means being number-base read-out devices;

b. electric isolation devices being diodes; and, c. one of said diodes being connected between each said number-base read-out device (required for each said contact union) and each said contact union;

1. permitting, however, as said, one such connection to each of all said number-base read-out devices to be directly connected without an intervening said diode device;
2. and permitting also in case of more than a first connected contact union to a pair of number-base read-out device connections, one said diode only to interconnect between first said contact union and any later connected contact union to be represented by the same pair of said number-base read-out devices;
3. and permitting also, in the case of more than one contact union to be connected to the same three said number-base read-out device connections the use of one only diode in the same fashion as (2) and so on in the case of contact unions to be connected to the same four or higher number of number-base read-out devices.

7. In an information storage and read-out network, as described in claim 4 and comprising:

a. multiple output indicator means being relay devices;

b. magnetic tape players; and, c. said relay devices being connected to control said magnetic tape players.

8. In an information storage and read-out network, as described in claim 4 and comprising:

a. multiple output indicator means being power switching devices;

b. said power switching devices being connected to control other output indicator means.

9. In an information storage and read-out network, said network comprising:

a. a first and second basic switch member each said basic switch having one or more movable contacts and each movable contact having two or more stationary contacts;

b. a transistor array, and transistors in said array arrangeable as if in rows and columns, and each transistor of said array having a first, a second and a third transistor connection;

c. in said transistor array each column of transistors being interconnected at said first connection of each said transistor to form an array-column-connection, there being one said array-column-connection for each said column in said array;

d. in said transistor array each row of transistors being interconnected at said second connection of each said transistor to form an array-row-connection, there being one said array-row-connection for each said row in said array;

e. in said transistor array each said array-row-connection being connected to a said stationary contact of said first basic switch member and each said array-column-connection being connected to a said stationary contact of said second basic switch member;

f. multiple output indicator means, each said output indicator means being electrically operable and having electric contact connections;

g. said third transistor connection of said transistors of said transistor array being a transistor output terminal;

h. said transistor output terminals that represent the same output significance or information being interconnected to form contact unions, said transistor output terminals that represent unique significance or information also being called contact unions;

i. current isolation devices;

j. one said current isolation device being interconnected between each said output indicator means required for representing said output significance or information of each said contact union and that said contact union;

k. permitting however, one such connection to each of all said output indicator means to be directly connected without an intervening said current isolation device;

l. a first power source being connected to one of said electric contact connections of each said output indicator means, and said first power source being connected also to said moving contact of said first basic switch member; and, m. a second power source connected to said moving contact of said second basic switch member and also to said moving contact of said first basic switch member.

10. In an information storage and read-out network according to claim 9 and comprising:

a. said multiple output indicator means being relays; and, b. said relays being connected to control other output indicating means.

11. In an information storage and read-out network according to claim 9 and comprising:

a. said multiple output indicator means being number-base read-out devices;

b. electric isolation devices being diodes; and, c. one of said diodes being interconnected between each said number-base read-out device required for each said contact union;

1. permitting, however, as said, one such connection to each of all said number-base read-out devices to be directly connected without an intervening said diode device;

2. and permitting also in case of more than a first connected contact union to a pair of number-base read-out device connections, one said diode only to interconnect between first said contact union and any later connected contact union to be represented by the same pair of said number-base read-out devices;

3. and permitting also, in the case of more than one contact union to be connected to the same three number-base read-out device connections, the use of one only diode in the same fashion as (2) and so on in the case of contact unions to be connected to the same four or higher number of number-base read-out devices.

* * * * *